United States Patent
Duggal et al.

(10) Patent No.: US 10,120,875 B1
(45) Date of Patent: Nov. 6, 2018

(54) METHOD AND SYSTEM FOR DETECTING BOUNDARIES OF DATA BLOCKS FOR DEDUPLICATION

(71) Applicant: EMC Corporation, Hopkinton, MA (US)

(72) Inventors: Abhinav Duggal, Santa Clara, CA (US); Anshita Agrawal, Karnataka (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 923 days.

(21) Appl. No.: 14/558,626

(22) Filed: Dec. 2, 2014

(51) Int. Cl.
*G06F 17/30* (2006.01)
*G06F 11/14* (2006.01)

(52) U.S. Cl.
CPC .. *G06F 17/30156* (2013.01); *G06F 17/30091* (2013.01); *G06F 17/30159* (2013.01); *G06F 11/1453* (2013.01)

(58) Field of Classification Search
CPC .................. G06F 17/30156; G06F 17/30159
USPC ........................................................ 707/692
See application file for complete search history.

(56) References Cited

U.S. PATENT DOCUMENTS

| | | | | |
|---|---|---|---|---|
| 7,925,683 B2* | 4/2011 | Jain | ...................... | G06F 3/0641 707/609 |
| 8,234,468 B1* | 7/2012 | Deshmukh | ........ | G06F 17/30156 711/162 |
| 9,087,086 B1* | 7/2015 | Li | ..................... | G06F 17/30156 |
| 2008/0033974 A1* | 2/2008 | Cameron | .............. | G06F 17/272 |

OTHER PUBLICATIONS

Thornton, Graham, "Disassembling the Oracle Data Block," Revised Sep. 19, 2005, 38 pages.

\* cited by examiner

*Primary Examiner* — Thu-Nguyet Le
(74) *Attorney, Agent, or Firm* — Womble Bond Dickinson (US) LLP

(57) ABSTRACT

Techniques for deduplicating data streams are described herein. According to one embodiment, a first data stream is received to be stored in a storage system, where the first data stream includes data blocks and each data block includes a header and a footer. A boundary detector is to detect boundaries of the data blocks by matching at least a portion of a header with a footer of each data block and a header of an adjacent data block. An anchoring unit is to anchor the first data stream based on the determined boundaries of the data blocks using a plurality of anchors. A deduplication engine is to deduplicate the first data stream into a plurality of deduplicated data segments based on the plurality of anchors. The deduplicated data segments are then stored in one or more persistent storage devices of the storage system.

25 Claims, 8 Drawing Sheets

METHOD AND SYSTEM FOR DETECTING BOUNDARIES OF DATA BLOCKS FOR DEDUPLICATION

FIELD OF THE INVENTION

Embodiments of the present invention relate generally to data storage systems. More particularly, embodiments of the invention relate to data block boundary detection of data blocks for deduplication.

BACKGROUND

Some backup streams are block-based backups. These blocks are structured data-sets which consists of a metadata portion and data portion. Content based anchoring does not work well with block-based backups because the anchors can span block boundaries. For block backups, block-based anchoring is done to align anchor points at the block boundaries. This results in most-effective deduplication for such backups. If the blocks are bigger than a maximum supported segment size of a file system, hybrid anchoring/chunking may be used. In hybrid chunking, anchoring is done on the block boundary along with content-based anchoring in-between. Hybrid chunking ensures that deduplication opportunities are not lost within the block, besides the block boundaries.

For some data blocks, such as Oracle® data blocks, metadata portion can change more frequently than the data portion hence can degrade deduplication of database backups. When that happens, the metadata needs to be removed before anchoring is done. In such cases, the metadata portion of these data blocks is treated as a marker inside by the file system of a storage system. A marker refers to a metadata portion inside a data stream, which may be introduced by backup applications. These markers change even when the data portion in the stream has not changed. Anchoring is done on the data portion of the block after removing the metadata portion and storing the metadata separately inside the file system.

In a conventional scheme, a byte pattern is used to first find a marker. Once the marker is detected, it is removed and block-based or hybrid anchoring is performed. In this scheme, first markers are found and then boundaries are detected relative to the marker pattern location. Detecting the marker first using a pattern has a side effect of wrongly detecting markers in cases when the pattern is weak. For example, in case of a particular data stream such as an Oracle® data stream, the pattern used to determine there is a marker or not, is a weak pattern, hence it can result in a false positive. Frequent false positives can hurt deduplication of the data stream. Another stream can be treated as an Oracle® stream hence hurting deduplication due to forced anchors at presumed block boundaries. An Oracle® stream containing a false positive marker pattern in the data portion of the block can also result forced anchoring and hence hurt deduplication.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
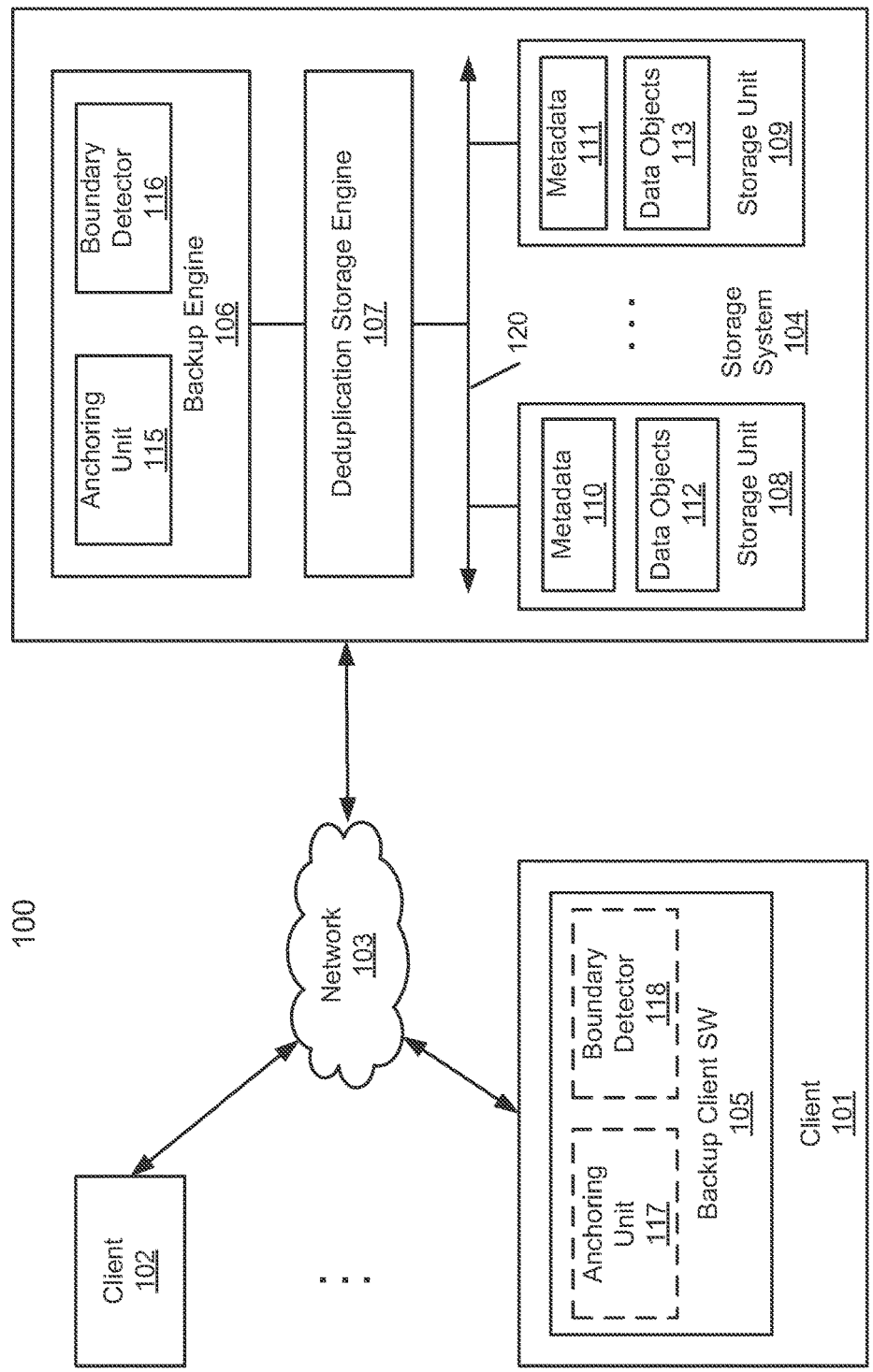
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, instead of finding markers first, the block boundaries of data blocks are determined. A block boundary of a particular data block may be determined by matching at least a portion of content of a header of the data block with content of a footer of the data block within a predetermined proximity of a distance or offset from the header. In one embodiment, a boundary detector or boundary detection logic may search an area around a potential block size of a first data block to locate the matching content in a potential footer of the first data block. Once the matching content is located or identified, the potential block boundary may be found. However, due to the weak pattern or potential collision of the content matching, there is a chance of false positive.

In order to reduce the false positive, according to one embodiment, the boundary detector may further search another proximity after the potential block boundary to locate a second header of a potential second data block that is adjacent to the first data block. Since the headers of the data blocks may contain similar content, if the second header is found or confirmed, the block boundary may be confirmed. By matching the content of a header with a footer of a data block, as well as, the header of an adjacent data block, the chance of the false positive can be greatly reduced. The boundary detection can be iteratively performed for different potential block size candidates and/or data matching pattern candidates if the block size is unknown prior to receiving the data stream.

Once the block boundaries of the data stream have been determined, according to one embodiment, markers around the block boundaries may be identified and optionally removed by a marker detector. The markers may be separately stored with or without deduplication, as long as they can be located during recovery of the data stream. The data stream is then anchored with predetermined anchors or indicators by an anchoring unit. The anchored data stream is then deduplicated into deduplicated data segments by a deduplication engine. The deduplicated data segments are then stored in a storage device of a storage system.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Alternatively, any of clients 101-102 may be a primary storage system that provides storage to other local clients, which may periodically back up the content stored therein to a backup storage system, such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include any type of server or cluster of servers. For example, storage system 104 may be a storage server used for any of various different purposes, such as to provide multiple users with access to shared data and/or to back up data (e.g., mission critical data). In one embodiment, storage system 104 includes, but is not limited to, backup engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

In response to a data file to be stored in storage units 108-109, deduplication storage engine 107 is configured to segment the data file into multiple chunks (also referred to as segments) according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

In one embodiment, any of clients 101-102 may further include an optional deduplication engine (e.g., deduplication engines 151-152) having at least a portion of functionalities of deduplication engine 107. Deduplication engines 151-152 are configured to perform local deduplication operations, respectively. For example, prior to transmit data to storage system 104, each of the deduplication engines 151-152 may deduplicate the data into deduplicated segments and determine whether a particular deduplicated segment has been stored in storage system 104. A deduplicated segment is transmitted to storage system 104 only it has not been stored in storage system 104.

For example, when client 101 is about to transmit a data stream (e.g., a file or a directory of one or more files) to storage system 104, deduplication engine 151 is configured to deduplicate the data stream into deduplicated segments. For each of the deduplicated segments, client 101 transmits a fingerprint of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic and the processing resources required can be greatly reduced.

In one embodiment, backup engine 106 includes anchoring unit 115 and boundary detector or detection logic 116. Anchoring unit 115 and/or boundary detector may also be implemented as part of deduplication engine 107. When a data stream such as a backup stream received from a client, such as client 101, boundary detector 116 is to scan the data stream to detect and determine boundaries of the data blocks embedded within the data stream. Once the boundaries of the data blocks are determined, anchoring unit 115 is to anchor the data stream based on the boundaries determined by boundary detector 116. Based on the anchors provided by anchoring unit 115, deduplication engine 107 is to segment the data stream into data segments and deduplicate the data segments into deduplicated data segments (or deduplicated data chunks). The deduplicated data segments are then stored in any of storage units 108-109.

According to one embodiment, instead of finding markers first, the block boundaries of data blocks are determined. A block boundary of a particular data block may be determined by matching at least a portion of content of a header of the data block with content of a footer of the data block within a predetermined proximity of a distance or offset from the header. In one embodiment, boundary detector 116 may search an area around a potential block size of a first data block to locate the matching content in a potential footer of the first data block. Once the matching content is located or identified, the potential block boundary may be found. However, due to the weak pattern or potential collision of the content matching, there is a chance of false positive.

In order to reduce the false positive, according to one embodiment, boundary detector 116 may further search another proximity after the potential block boundary to locate a second header of a potential second data block that is adjacent to the first data block. Since the headers of the data blocks may contain similar content, if the second header is found or confirmed, the block boundary may be confirmed. By matching the content of a header with a footer of a data block, as well as, the header of an adjacent data block, the chance of the false positive can be greatly reduced. The boundary detection can be iteratively performed by boundary detector 116 for different potential block size candidates and/or data matching pattern candidates if the block size is unknown prior to receiving the data stream.

Once the block boundaries of the data stream have been determined, according to one embodiment, markers around the block boundaries may be identified and optionally removed by a marker detector (not shown). The markers may be separately stored with or without deduplication, as long as they can be located during recovery of the data stream. The data stream is then anchored with predetermined anchors or indicators by anchoring unit 115. The anchored data stream is then deduplicated into deduplicated data segments by deduplication engine 107. The deduplicated data segments are then stored in any of storage devices 108-109.

In one embodiment, anchoring unit 115 and/or boundary detector 116 may also be implemented at the client side, for example, as part of anchoring unit 117 and boundary detector 118 of client 101. Client 101 may be a primary storage system to periodically backup its data to storage system 104. Client 101 may also be another backup storage system, such as a source storage, that periodically migrate its data to storage system 104 as a target storage system. The boundary detection, anchoring, and/or deduplication may be performed at the client side. In such a configuration, prior to transmitting data over to storage system 104, fingerprints of the data segments may be transmitted to storage system 104 to determine whether any of the data segments have been previously received from the client. Only the new or modified segments will be transmitted over to reduce network traffic.

Note that, some or all of the components as shown in FIG. 1 may be implemented as processing logic in software, hardware, or a combination thereof. Also note that although a backup storage system is utilized as an example of a storage system in which the techniques for determining boundaries and anchoring data blocks of a data stream, the techniques described throughout this application can also be applied to other types of software or systems.

Figure 2:
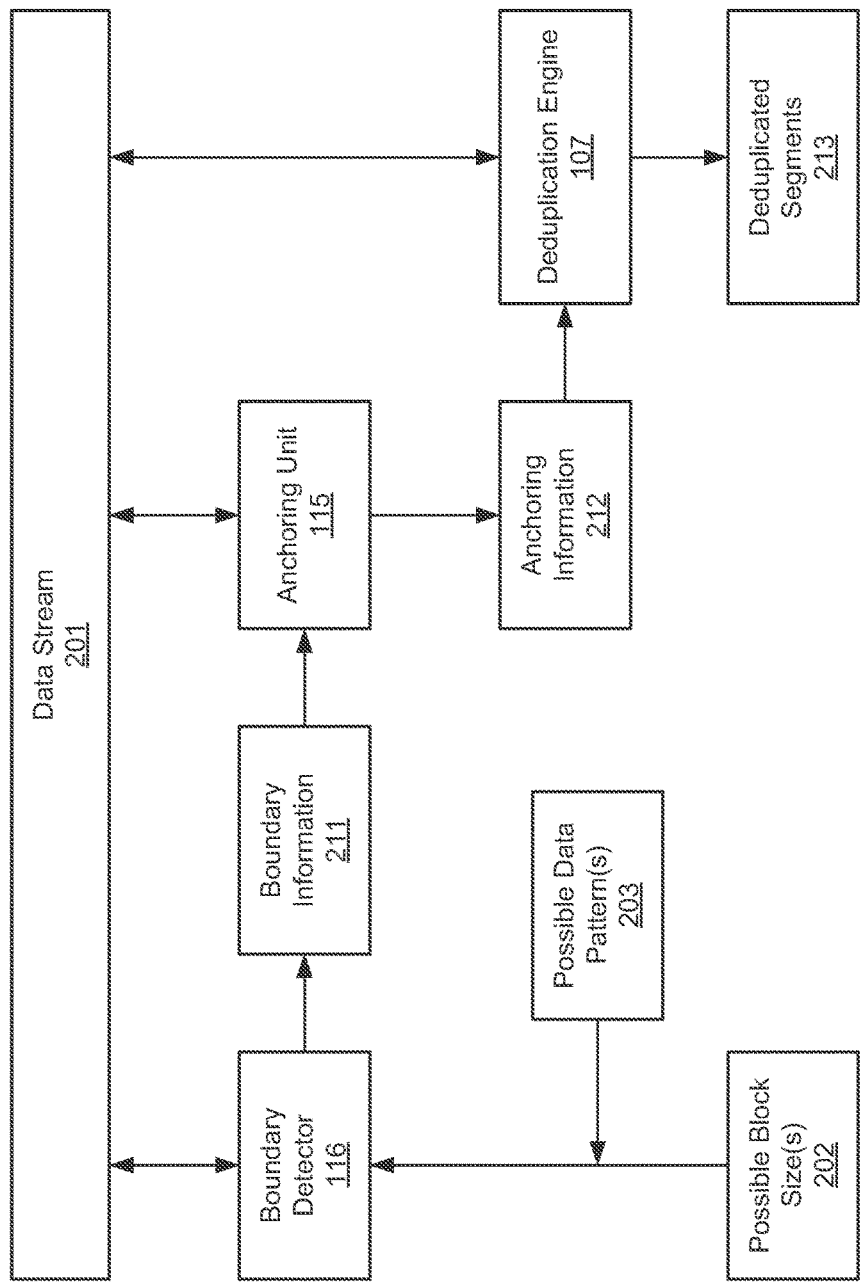
FIG. 2 is a block diagram illustrating a storage system according to another embodiment of the invention.

FIG. 2 is a block diagram illustrating a storage system according to another embodiment of the invention. For example, system 200 may be implemented as part of storage system 104 of FIG. 1. Referring to FIG. 2, data stream 201 is received by a system interface from a client, such as a remote storage system. Data stream 201 includes many data blocks, where data stream 201 may be a backup stream from a host, a primary storage system, or a source backup system. Boundary detector 116 may scan data stream data 201 to determine boundaries of the data blocks within data stream 201. In one embodiment, boundary detector 116 scans from the beginning of data stream 201 to search for content matching a particular data pattern. The data pattern may be selected from possible data patterns 203, which may represent certain uniqueness or a signature of a particular type or types of data streams.

Based on the data pattern, boundary detector 116 may potentially identify a location of a header of a data block. Once the header is potentially found, boundary detector 116 further search an area that is within a proximity of a potential block size that is selected from possible block sizes 202. Typically, certain content or data of a header also exist in a footer of the same data block. By searching some of the content of the header in an area around the potential block boundary based on the potential block size, the footer may be found. In one embodiment, if a footer cannot be found for a particular block size candidate, another block size candidate can be utilized. In one embodiment, the potential block sizes can be 2 kilobytes (KB), 4 KB, 8 KB, 16 KB, or 32 KB, etc. Similarly, if a header or footer cannot be found based on one data pattern, another data pattern can be utilized. As described above, different types of data streams from different data providers or vendors may have different data patterns or signatures that in certain degrees represent the uniqueness of the data streams.

Figure 3A:
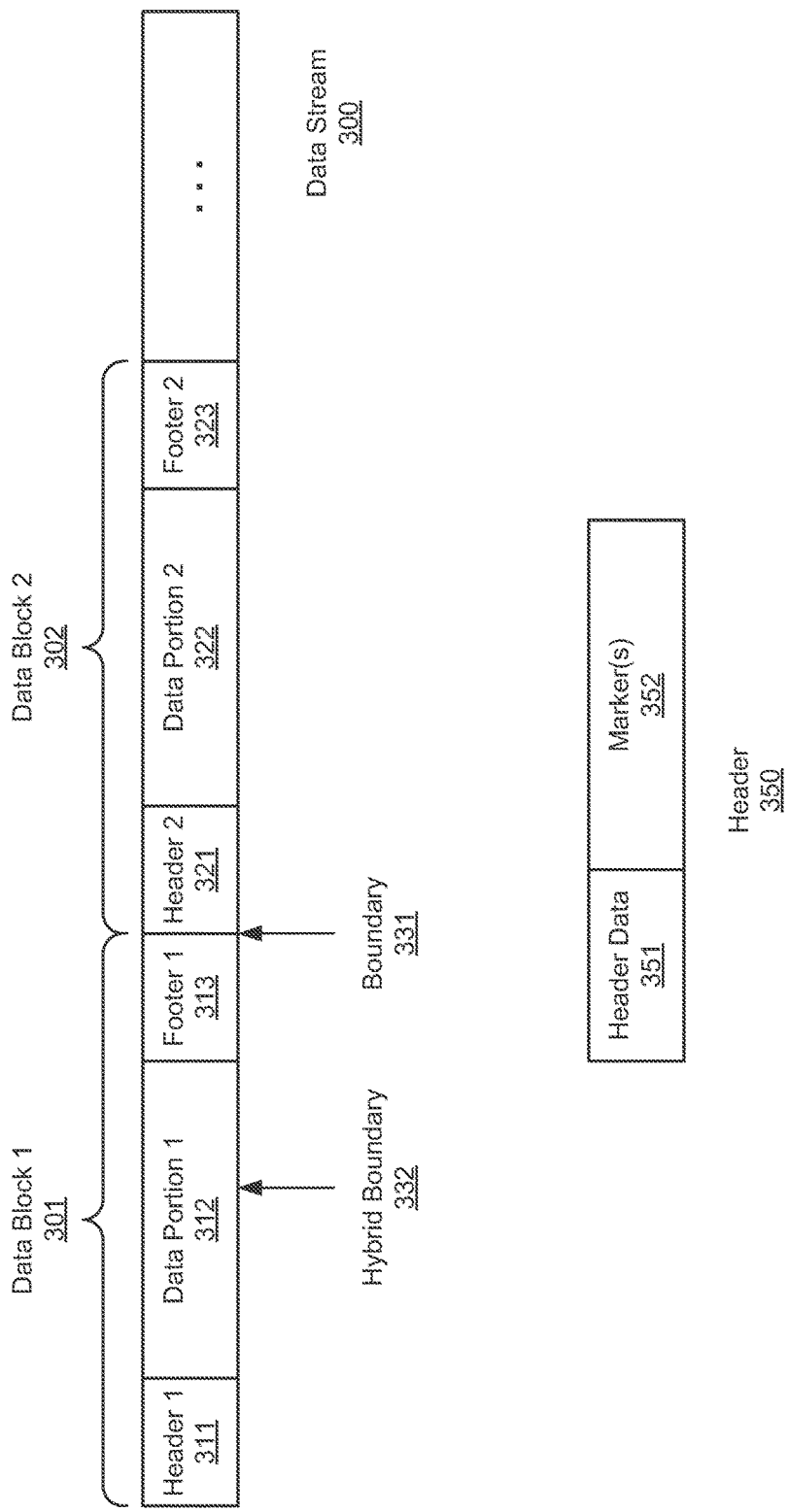
FIGS. 3A and 3B are block diagrams illustrating examples of data structures according to certain embodiments of the invention.

Referring now to FIG. 2 and FIG. 3A, data stream 300 include many data blocks, for example, in sequence, including data blocks 301-302. Each of the data blocks includes a header (e.g., headers 311 and 321), a data portion or payload (e.g., data portions 312 and 322), and a footer (e.g., footers 313 and 323). In one embodiment, for a given or selected data pattern (also referred to as a header indicator, header metadata, weak pattern), boundary detector 116 searches from the beginning of data stream 300. Once there is match, boundary detector 116 marks down or indicates the beginning of a header of a data block, in this example, header 311 of data block 301. At this point, boundary detector 116 may not know where footer 313 of data block 301 is. However, based on the common or popular data block sizes, boundary detector 116 can guess that footer 313 should be located within a proximity of an offset from header 311, which is represented by one of the common or popular data block size.

In one embodiment, boundary detector 116 may search a predetermined proximity around an offset from header 311 based on a given data block size. Specifically, boundary detector 116 searches the area based on some content or data of header 311, assuming footer 313 may contain some of the content or data of header 311. If the matching data is found, footer 313 is potentially found and boundary 331 is also potentially found. In addition, according to one embodiment, once the potential block boundary 331 is found, boundary detector 116 further searches a predetermined proximity after the potential boundary 331 to determine whether a header of an adjacent data block can be found, in this example, header 321 of data block 302. If header 321 is found, boundary 331 is now confirmed. The rationale behind this is that even if header 311 and footer 313 are found, there is still a chance of collision or false positive because of the weak pattern being searched. If a header of an adjacent data block immediately following the first data block, the chance of false positive can be significantly reduced.

Once the boundaries of data stream 300 have been determined using the techniques described above, anchoring unit 115 is to anchor the boundaries determined by boundary detector 116. According to one embodiment, if a determined block size or boundary of a data block exceeds a maximum segment size for deduplication, a hybrid anchoring is performed between the header and footer of the corresponding data block, in this example, at hybrid boundary 332, such that the anchored segments will fit within the maximum segment size of the storage system.

Figure 3B:
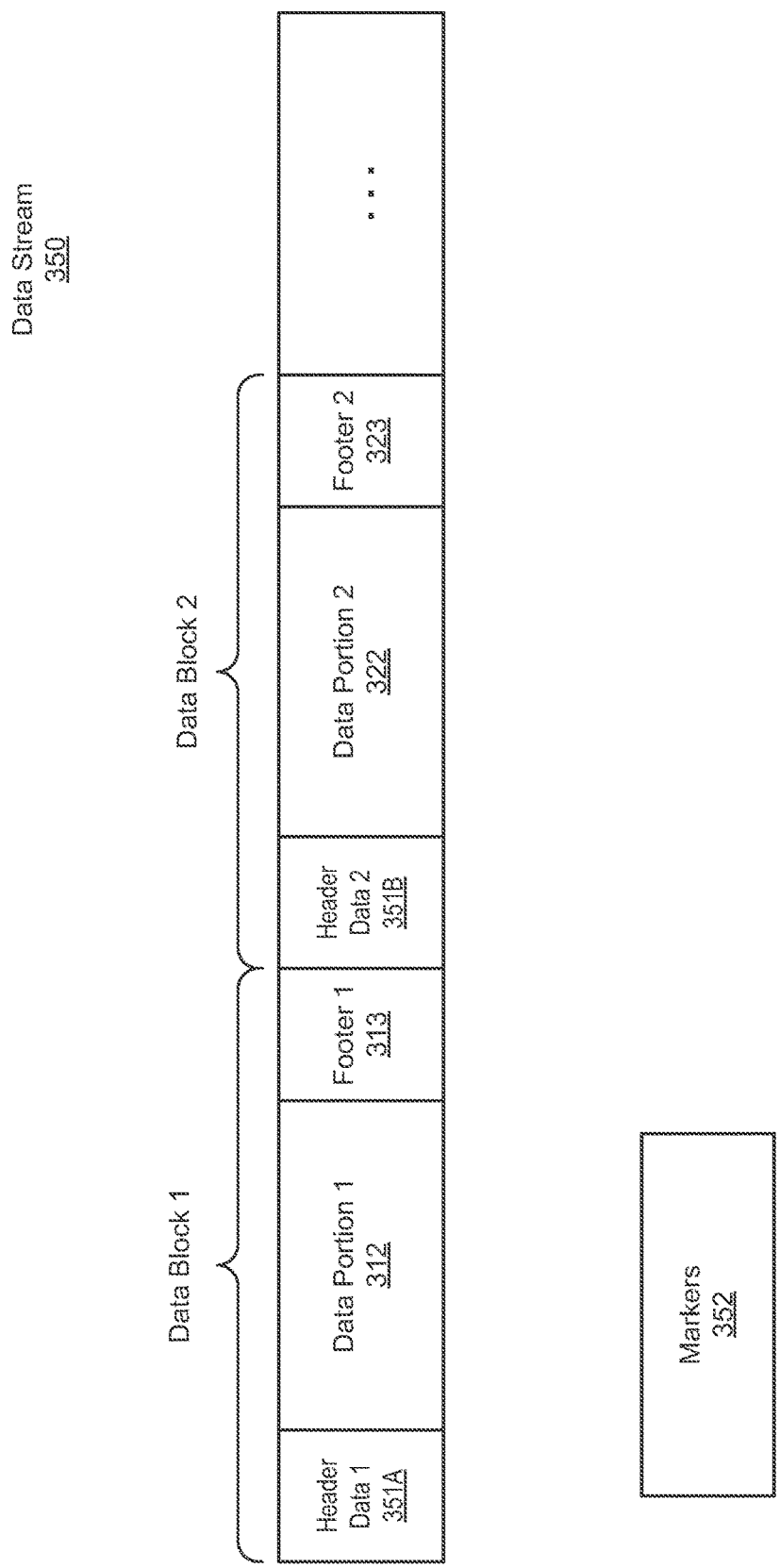

Some of the headers 311-321 may include header data and one or more markers therein. As an example, header 350 may represent any of the headers 311-312, including header data 351 and marker 352. Marker 352 may be inserted by a client application or software (e.g., client software 105 of FIG. 1), which may not be part of native data stream 300. According to one embodiment, prior to anchoring data stream 300, markers 352 may be removed, forming another data stream without the markers as shown in FIG. 3B. In one embodiment, data stream 300 of FIG. 3A may be an Oracle® compatible data stream. Further detailed information concerning an Oracle® compatible data stream can be found in article entitled "Disassembling the Oracle Data Block" by Graham Thornton, published Sep. 19, 2005, which is incorporated by reference herein in its entirety. However, the techniques described throughout this application can also be applied to any data stream made of data blocks, where each data block includes a header and a footer.

In some cases, client software (e.g., backup client application 105 of FIG. 1) may insert its own data or metadata into one or more data blocks of a source data stream received at the server, which may cause a misalignment of other data blocks within the data stream. In such a case, boundary detector 116 may not be able to find the header/footer match of the data blocks with inserted data/metadata, because the distance between a header and a footer does not match an expected block size. However, the techniques described herein can still work here. Even though boundary detector 116 might not detect the boundaries and do variable sized segmentation for those particular data blocks, however later on boundary detector 116 can do a fresh start for finding the weak pattern again. Once boundary detector 116 matches the header with the footer of a data block, boundary detector 116 will find the right boundary. Once the first correct boundary is detected, boundary detector 116 can keep detecting the subsequent boundaries by matching the header with the footer at the distance of the block size followed by the matching the bytes in the header of the next block.

Therefore even if boundary detector 116 fails to detect a boundary and/or markers at some point in the data stream due to some backup application data, boundary detector 116 can recover and start a fresh search and find the right boundaries again. Hence the algorithm described herein is resilient to backup application metadata inserted in the data stream. This is subject to the fact the backup application metadata even if periodic occurs at less frequency than the distance between the block boundaries. If the backup application metadata occurs in between every block boundary, boundary detector 116 might not detect the right boundaries. However, this is unlikely scenario and does not occur in reality. In general, backup application can insert some metadata which might or might not be periodic. Some applications can insert a header in the beginning of the data stream. In cases even if it is periodic, it is not frequent enough and will impact very few Oracle blocks. In cases even when the meta-data is periodic enough to impact a lot of blocks, according to one embodiment, the restriction of distance to search for the footer can be relaxed and changed to a minimum distance rather than fixed distance. With a minimum distance of block size, pattern match the head with the tail to find the right boundaries even for distance greater than the block size. Once they match, boundary detector 116 also looks for the header pattern in the next block following the footer to reduce the chances of false positive. Relaxing the fixed distance condition to minimum distance condition increases the chances of false positive but can be applied only to cases where the backup application meta-data is very periodic.

Referring back to FIG. 2, once the boundaries have been determined, boundary detector 116 provides boundary information 211 to anchoring unit 115. Anchoring unit 115 is to anchor data stream 201 based on boundary information 211 to provide anchoring information 212. Anchoring information 212 is used by deduplication engine 107 to segment and deduplicate data stream 201 into deduplicated segments 213, which are then stored in a persistent storage device.

Figure 4:
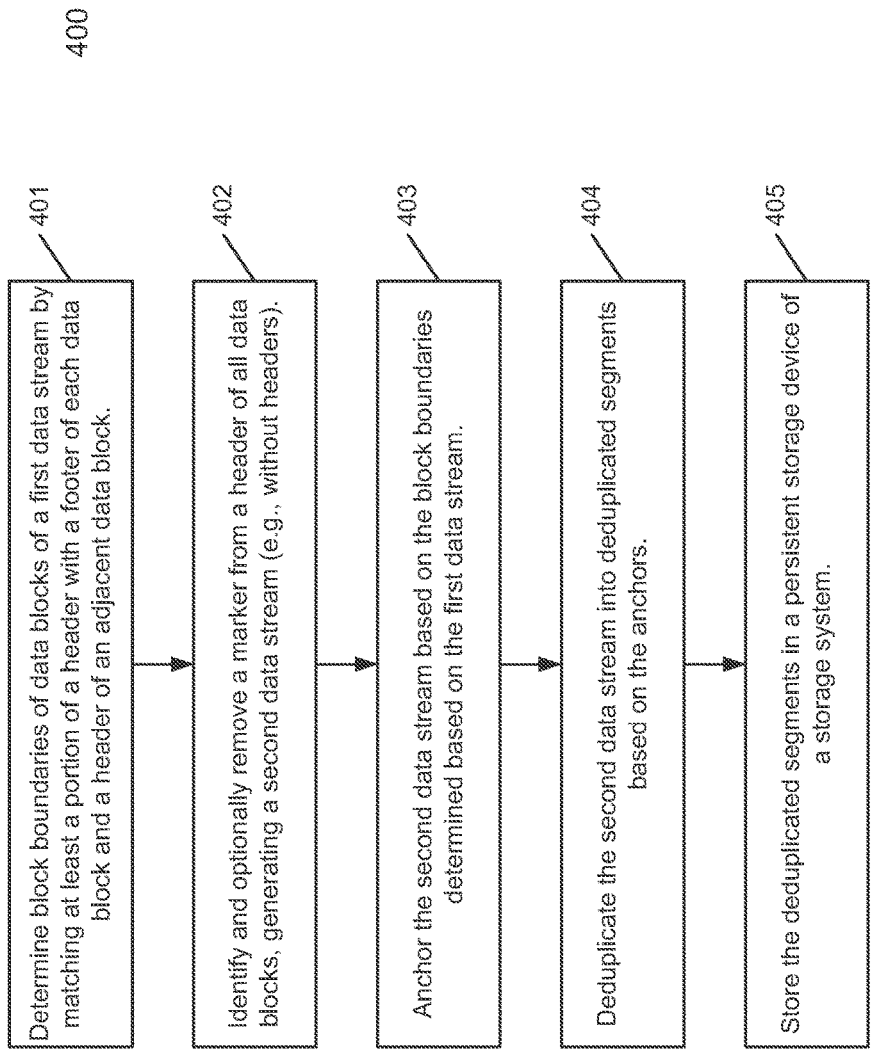
FIG. 4 is a flow diagram illustrating a process of deduplicating data blocks according to one embodiment of the invention.

FIG. 4 is a flow diagram illustrating a process of deduplicating data blocks according to one embodiment of the invention. Process 400 may be performed by processing logic which may include hardware, software, or a combination thereof. For example, process 400 may be performed by storage system 104 of FIG. 1. Referring to FIG. 4, at block 401, in response to a first data stream to be stored in a storage system, processing logic scans the first data stream to determine block boundaries of data blocks, by matching at least a portion of a header with a footer of each data block and a header of an adjacent data block. At block 402, processing logic identifies and optionally removes a maker from a header of at least some data blocks, generating a second data stream. At block 403, processing logic anchors the second data stream based on the block boundaries determined based on the first data stream. At block 404, the second data stream is deduplicated into deduplicated data segments based on the anchors. At block 405, the deduplicated data segments are then stored in a storage device.

Figure 5:
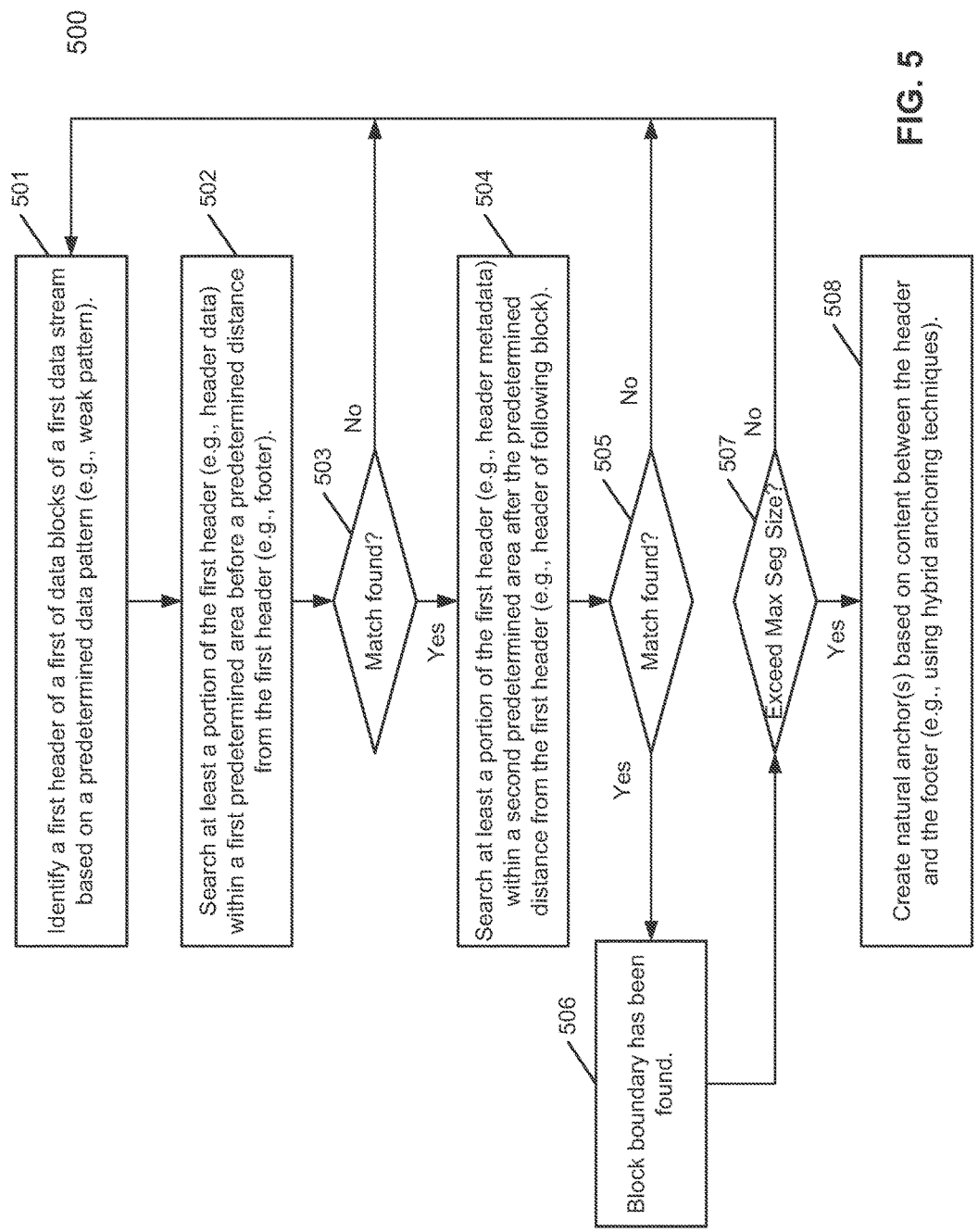
FIG. 5 is a flow diagram illustrating a process of determining boundaries of data blocks according to one embodiment of the invention.

FIG. 5 is a flow diagram illustrating a process of determining boundaries of data blocks according to one embodiment of the invention. Process 500 may be performed by processing logic which may include hardware, software, or a combination thereof. For example, process 500 may be performed as part of operations involved in block 401 of FIG. 4. Referring to FIG. 5, at block 501, processing logic identifies a first header of a first of the data blocks of a first data stream based on a predetermined data pattern (e.g., weak pattern). At block 502, processing logic searches at least a portion of the first header (e.g., header data) within a first predetermined area or proximity before a predetermined distance or offset from the first header (e.g., footer). If there is matching content found at block 503, processing logic searches at least a portion of the first header within a second predetermined area after the predetermined distance from the first header (e.g., header of the following block). If the matching content is found at block 505, the block boundary is confirmed at block 506. At block 507, processing logic determines whether the searching area exceeds the maximum deduplicated segment size and if so, at block 508, hybrid anchoring is performed based on the content between the header and the footer.

When a file such as a database file is received at a storage system such as a deduplicated storage system, the file is viewed as a stream of data blocks, with each data block having a header and a data portion. A header contains meta-data including design and specification of data structures used in the data block. A data portion contains only data content. A data block may be referred to as a data object, and the two terms are used interchangeably in this specification. A data block may be segmented into plurality of data chunks for deduplication purpose. A division of a portion of data created for duplication is referred as a chunk in this specification. A system may create chunks by determining anchor points within the file and denoting chunks as the data between anchor points. An anchor may be an offset within the data block demarking the beginning point for deduplication.

In one embodiment, a storage system may check for markers first, e.g., signature marked by a third party, embedded in the data content of a file. Markers are inserted in a structured data file in data operations prior to the file received at the storage system, e.g., for backup purpose. For example, a marker may be inserted in a file to mark the end of certain data type (boundary marker). The system may recognize these markers and remove these markers out of the block data. Meta-data, such as block headers, may also be considered as a marker, i.e., third party content related to the data. Then system may anchor the file at the location of the removed markers, and thus form chunks for deduplication. These markers may be stored separately without going through deduplication.

According to some embodiments, the storage system marks the data blocks for deduplication with first anchors based on their headers and at the boundaries between the headers and data portions. Then the system scans data portions of the data blocks. If certain characteristics satisfy a predetermined condition (e.g., the size of a data portion is bigger than a predetermined threshold), one or more anchors may be denoted in the data portions, in addition to the first anchors. In one embodiment, the predetermined threshold is a maximum chunk size defined by the storage system. In another embodiment, the predetermined threshold is an average chunk size defined by the storage system. The system marks more anchors in the data portions until the sizes of subsections of the data portion of the data block are less than the predetermined threshold. The anchoring process goes through the stream of data blocks.

Anchoring starts with the first block boundary. Then it switches anchoring to either fixed block anchoring or variable-sized anchoring until the next bock boundary is found. Thus the deduplication aligns with the block boundaries of a file's data block first, and then switch to anchoring based on either fixed block anchoring or variable-sized anchoring, through considering the different characteristics of header and data content. This is referred to as hybrid chunking. The hybrid chunking, by considering the specific characteristics of structured datasets and utilizing various techniques to deduplicate data content, achieves a better deduplication efficiency than both fixed-block anchoring and various-block anchoring. After the file is divided into chunks, the data chunks of the file go through the deduplication process.

In one embodiment, the system stores headers of data blocks separately from the data portions. The headers may or may not go through a deduplication process depend upon the characteristics of the headers. One approach is to divide the headers into deduplication segments and non-deduplication segments, and the two types of segments are stored separately and then the former going through deduplication, and the latter does not. The data portions, which may be sub-chunked, go through the deduplication process. Since headers of the data blocks are prone to change more frequently as compared to block data and even changing without change of block data, deduplicating those yields less saving in a storage space and still increases the database size, deduplication time, and fragmentation of the file. By deduplicating only the data portions and possibly sub-chunking the data portions, the system has a better deduplication efficiency.

Further detailed information concerning the hybrid anchoring techniques can be found in a co-pending U.S. patent application Ser. No. 13/538,964, entitled "Method and System to Improve Deduplication of Structured Datasets using Hybrid Chunking and Block Header Removal," filed Jun. 29, 2012, assigned to a common assignee of the present application, which is incorporated by reference herein in its entirety.

Figure 6:
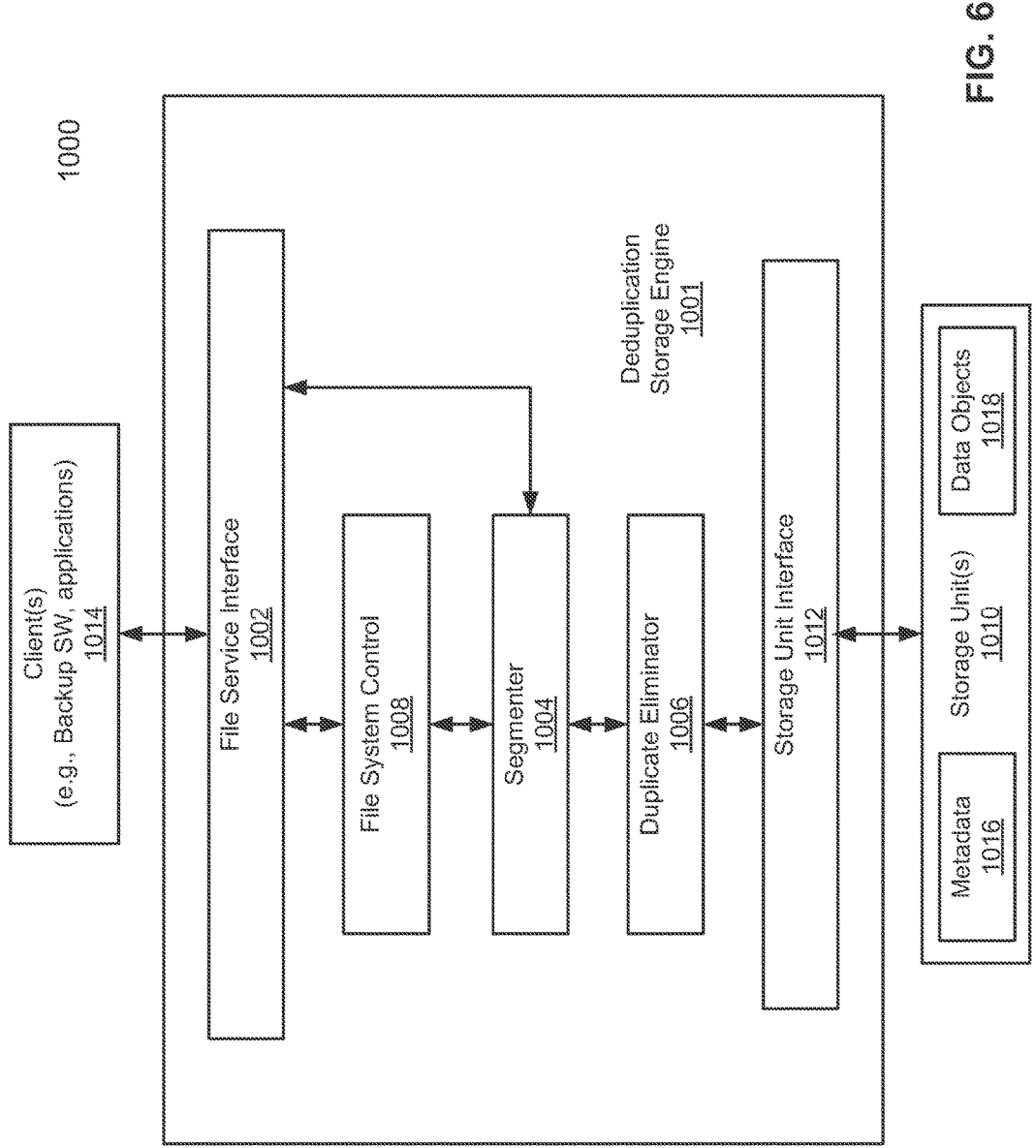
FIG. 6 is a block diagram illustrating a deduplicated storage system according to one embodiment of the invention.

FIG. 6 is a block diagram illustrating a deduplication storage system according to one embodiment of the invention. For example, deduplication storage system 1000 may be implemented as part of a deduplication storage system as described above, such as, for example, the deduplication storage system as a client and/or a server as shown in FIG. 1. In one embodiment, storage system 1000 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 1000 may have a distributed architecture, or all of its components may be integrated into a single unit. Storage system 1000 may be implemented as part of an archive and/or backup system such as a deduplicating storage system available from EMC® Corporation of Hopkinton, Mass.

In one embodiment, storage system 1000 includes a deduplication engine 1001 interfacing one or more clients 1014 with one or more storage units 1010 storing metadata 1016 and data objects 1018. Clients 1014 may be any kinds of clients, such as, for example, a client application, backup software, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices or units 1010 may be implemented locally (e.g., single node operating environment) or remotely (e.g., multi-node operating environment) via an interconnect, which may be a bus and/or a network (e.g., a storage network). In one embodiment, one of storage units 1010 operates as an active storage to receive and store external or fresh user data from a client (e.g., an end-user client or a primary storage system associated with one or more end-user clients), while the another one of storage units 1010 operates as a target storage unit to periodically archive data from the active storage unit according to an archiving policy or scheme. Storage units 1010 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1010 may also be combinations of such devices. In the case of disk storage media, the storage units 1010 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 1016, may be stored in at least some of storage units 1010, such that files can be accessed independent of another storage unit. Metadata of each storage unit includes enough information to provide access to the files it contains. In one embodiment, metadata may include fingerprints contained within data objects 1018, where a data object may represent a data chunk, a compression region (CR) of one or more data chunks, or a container of one or more CRs. Fingerprints are mapped to a particular data object via metadata 1016, enabling the system to identify the location of the data object containing a data chunk represented by a particular fingerprint. A fingerprint may be generated based on at least a portion of a data chunk, for example, by applying a predetermined mathematical algorithm (e.g., hash function) to at least a portion of the content of the data chunk. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 1016 may include a file name, a storage unit identifier (ID) identifying a storage unit in which the chunks associated with the file name are stored, reconstruction information for the file using the chunks, and any other appropriate metadata information. Metadata 1016 may further include a chunk ID, a chunk sketch, a hash of a chunk, an encrypted hash of a chunk, random data, or any other appropriate metadata. In some embodiments, metadata associated with a chunk is used to identify identical and/or similar data segments. The stored metadata enables a faster identification of identical and/or similar data chunks as an ID and/or sketch (e.g., a set of values characterizing the chunk) do not need to be recomputed for the evaluation of a given incoming data segment.

In one embodiment, a chunk ID includes one or more deterministic functions of a data chunk (also referred to as a data segment), one or more hash functions of a data chunk, random data, or any other appropriate data chunk ID. In various embodiments, a data chunk sketch includes one or more deterministic functions of a data chunk, one or more hash functions of a data chunk, one or more functions that return the same or similar value for the same or similar data chunks (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a chunk. For example, a sketch may be generated by applying one or more functions (e.g., hash functions) on a chunk and a subset of the results of the functions performed on the chunk (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 1001 includes file service interface 1002, segmenter 1004 (also referred to as a chunking module or unit), duplicate eliminator 1006, file system control 1008, and storage unit interface 1012. Deduplication storage engine 1001 receives a file or files (or data item(s)) via file service interface 1002, which may be part of a file system namespace 1020 of a file system associated with the deduplication storage engine 1001. The file system namespace 1020 refers to the way files are identified and organized in the system. An example is to organize the files hierarchically into directories or folders, which may be managed by directory manager 1022. File service interface 1012 supports a variety of protocols, including a network file system (NFS), a common Internet file system (CIFS), and a virtual tape library interface (VTL), etc.

The file(s) is/are processed by segmenter 1004 and file system control 1008. Segmenter 1004, also referred to as a content store, breaks the file(s) into variable-length chunks based on a variety of rules or considerations. For example, the file(s) may be broken into chunks by identifying chunk boundaries. Chunk boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more chunks that originally made up a data block, data stream, file, or directory that was/were previously stored.

In some embodiments, chunks are segmented by identifying chunk boundaries that are content-based, such as, for example, a hash function is applied to values of data within a sliding window through the data stream or block and when the hash function is equal to a value (or equal to one of several values) then a chunk boundary is identified. In various embodiments, chunk boundaries are identified using content based functions operating on a sliding window within a data stream or block that have a minimum or maximum or other value or any other appropriate content based chunking algorithm. In various embodiments, chunks include fixed-length chunks, variable length chunks, overlapping chunks, non-overlapping chunks, chunks with a minimum size, chunks with a maximum size, or any other appropriate chunks. In various embodiments, chunks include files, groups of files, directories, a portion of a file, a portion of a data stream with one or more boundaries unrelated to file and/or directory boundaries, or any other appropriate chunk.

In one embodiment, a chunk boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, file system control 1008, also referred to as a file system manager, processes information to indicate the chunk(s) association with a file. In some embodiments, a list of fingerprints is used to indicate chunk(s) associated with a file. File system control 1008 passes chunk association information (e.g., representative data such as a fingerprint) to index 1024. Index 1024 is used to locate stored chunks in storage units 1010 via storage unit interface 1012. Duplicate eliminator 1006, also referred to as a segment store, identifies whether a newly received chunk has already been stored in storage units 1010. In the event that a chunk has already been stored in storage unit(s), a reference to the previously stored chunk is stored, for example, in a chunk or segment tree associated with the file, instead of storing the newly received chunk. A chunk or segment tree of a file may include one or more nodes and each node represents or references one of the deduplicated chunks stored in storage units 1010 that make up the file. Chunks are then packed by a container manager (which may be implemented as part of storage unit interface 1012) into one or more storage containers stored in storage units 1010. The deduplicated chunks may be further compressed into one or more CRs using a variation of compression algorithms, such as a Lempel-Ziv algorithm before being stored. A container may contain one or more CRs and each CR may contain one or more deduplicated chunks (also referred to deduplicated segments). A container may further contain the metadata such as fingerprints, sketches, type of the data chunks, etc. that are associated with the data chunks stored therein.

When a file is to be retrieved, file service interface 1002 is configured to communicate with file system control 1008 to identify appropriate chunks stored in storage units 1010 via storage unit interface 1012. Storage unit interface 1012 may be implemented as part of a container manager. File system control 1008 communicates (e.g., via segmenter 1004) with index 1024 to locate appropriate chunks stored in storage units via storage unit interface 1012. Appropriate chunks are retrieved from the associated containers via the container manager and are used to construct the requested file. The file is provided via interface 1002 in response to the request. In one embodiment, file system control 1008 utilizes a tree (e.g., a chunk tree obtained from namespace 1020) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 1001 may be implemented in software (e.g., executable code executed in a memory by a processor), hardware (e.g., processor(s)), or a combination thereof. For example, deduplication engine 1001 may be implemented in a form of executable instructions that can be stored in a machine-readable storage medium, where the instructions can be executed in a memory by a processor.

In one embodiment, storage system 1000 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Figure 7:
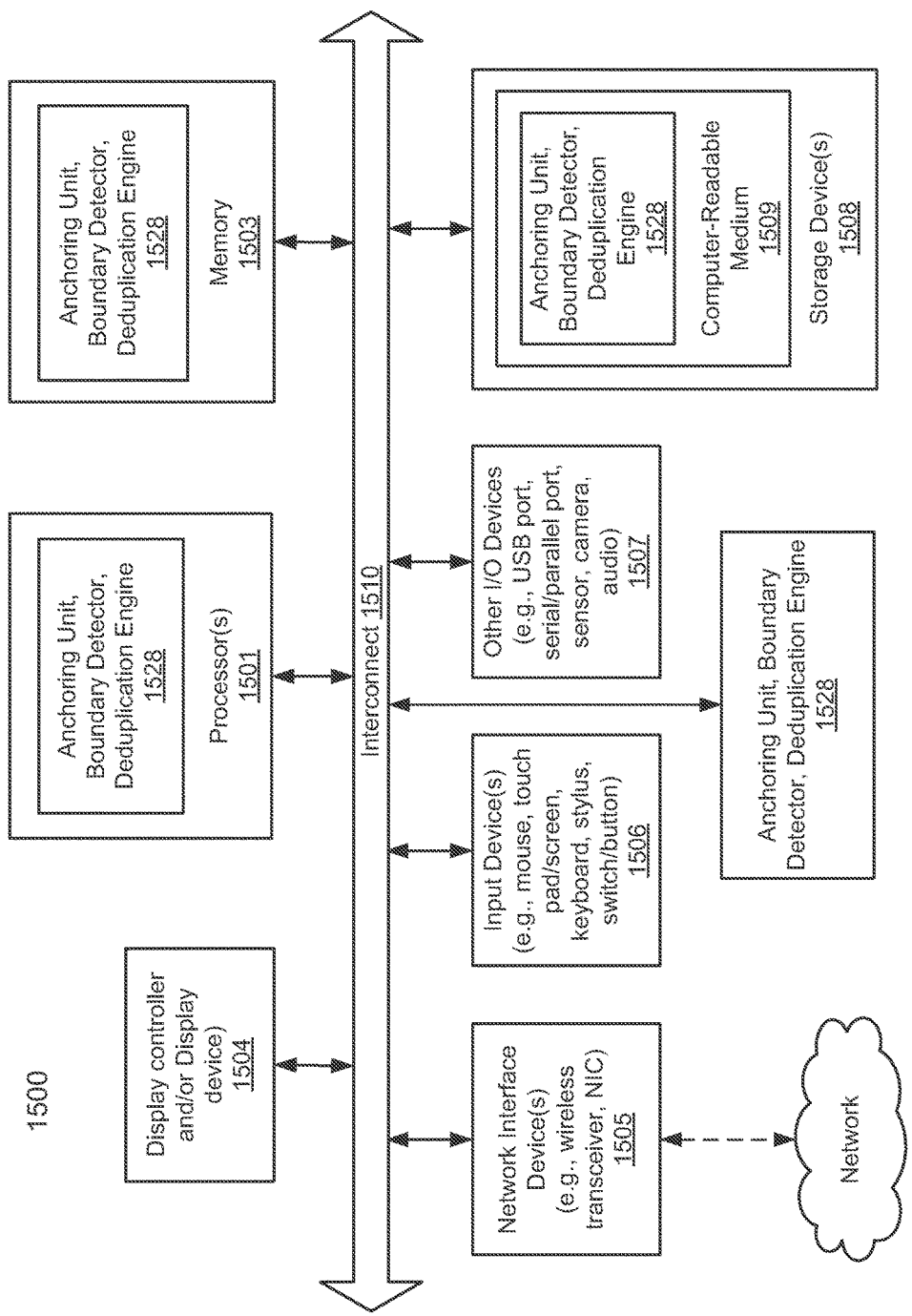
FIG. 7 is a block diagram illustrating an example of a data processing system which may be used with one embodiment of the invention.

FIG. 7 is a block diagram illustrating an example of a data processing system which may be used with one embodiment of the invention. For example, system 1500 may represents any of data processing systems described above performing any of the processes or methods described above, such as, for example, systems 101-102 and 104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a coprocessor, an embedded processor, or any other type of logic capable of processing instructions.

Processor 1501, which may be a low power multi-core processor socket such as an ultra low voltage processor, may act as a main processing unit and central hub for communication with the various components of the system. Such processor can be implemented as a system on chip (SoC). Processor 1501 is configured to execute instructions for performing the operations and steps discussed herein. System 1500 further includes a graphics interface that communicates with graphics subsystem 1504, which may include a display controller, a graphics processor, and/or a display device.

Processor 1501 may communicate with memory 1503, which in an embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, input device(s) 1506, and other IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for deduplicating data objects, the method comprising:
   receiving a first data stream to be stored in a storage system, the first data stream including a plurality of data blocks, wherein each data block includes a header and a footer;
   determining by a boundary detector boundaries of the data blocks by matching at least a portion of a header with a footer of each data block and matching the at least a portion of the header with a header of an adjacent data block;
   anchoring by an anchoring unit the first data stream based on the determined boundaries of the data blocks using a plurality of anchors;
   deduplicating by a deduplication engine the first data stream into a plurality of deduplicated data segments based on the plurality of anchors; and
   storing the deduplicated data segments in one or more persistent storage devices of the storage system.

2. The method of claim 1, further comprising:
   searching within a predetermined proximity of each determined boundary of the first data stream to identify one or more markers prior to anchoring the first data stream; and
   removing the one or more markers from the first data stream to generate a second data stream without the markers, wherein the anchoring by the anchoring unit is performed on the second data stream.

3. The method of claim 2, wherein searching within a predetermined area of each determined boundary of the first data stream comprises searching within a header area of each determined boundary of the first data stream to identify a marker based on a predetermined marker pattern.

4. The method of claim 1, wherein determining boundaries of the data blocks comprises:
   identifying a first header of a first of the data blocks of the first data stream based on a predetermined data pattern; and
   searching at least a first portion of content of the first header within a first proximity before a predetermined distance from the first header to identify content matching the first portion of the content of the first header.

5. The method of claim 4, wherein the first proximity before the predetermined distance represents a first footer of the first data block.

6. The method of claim 5, further comprising:
   determining whether a distance between the first header and the first footer is greater than a predetermined threshold; and
   performing a content-based anchoring on content between the first header and the first footer in response to determining that the distance between the first header and the first footer is greater than the predetermined threshold.

7. The method of claim 6, wherein the predetermined threshold represents a maximum deduplicated segment size of the storage system.

8. The method of claim 4, further comprising:
   if the matching content is found within the first proximity, searching at least a second portion of content of the first header within a second proximity after the predetermined distance to identify content matching the second portion of the content of the first header; and indicating that a boundary of a data block corresponding to the first header is confirmed.

9. The method of claim 8, wherein the second proximity after the predetermined distance is associated with a second header of a second data block as adjacent to the first data block.

10. The method of claim 8, further comprising:
if the matching content is not found within the first proximity, adjusting the predetermined distance based on one of a plurality of distance candidates; and
iteratively performing identifying the first header and searching within the first proximity based on the adjusted predetermined distance, wherein the plurality of distance candidates represents a list of possible data block sizes.

11. A non-transitory machine-readable medium having instructions stored therein, which when executed by a processor, cause the processor to perform operations of deduplicating data objects, the operations comprising:
receiving a first data stream to be stored in a storage system, the first data stream including a plurality of data blocks, wherein each data block includes a header and a footer;
determining by a boundary detector boundaries of the data blocks by matching at least a portion of a header with a footer of each data block and matching the at least a portion of the header with a header of an adjacent data block;
anchoring by an anchoring unit the first data stream based on the determined boundaries of the data blocks using a plurality of anchors;
deduplicating by a deduplication engine the first data stream into a plurality of deduplicated data segments based on the plurality of anchors; and
storing the deduplicated data segments in one or more persistent storage devices of the storage system.

12. The non-transitory machine-readable medium of claim 11, wherein the operations further comprise:
searching within a predetermined proximity of each determined boundary of the first data stream to identify one or more markers prior to anchoring the first data stream; and
removing the one or more markers from the first data stream to generate a second data stream without the markers, wherein the anchoring by the anchoring unit is performed on the second data stream.

13. The non-transitory machine-readable medium of claim 12, wherein searching within a predetermined area of each determined boundary of the first data stream comprises searching within a header area of each determined boundary of the first data stream to identify a marker based on a predetermined marker pattern.

14. The non-transitory machine-readable medium of claim 11, wherein determining boundaries of the data blocks comprises:
identifying a first header of a first of the data blocks of the first data stream based on a predetermined data pattern; and
searching at least a first portion of content of the first header within a first proximity before a predetermined distance from the first header to identify content matching the first portion of the content of the first header.

15. The non-transitory machine-readable medium of claim 14, wherein the first proximity before the predetermined distance represents a first footer of the first data block.

16. The non-transitory machine-readable medium of claim 15, wherein the operations further comprise:

determining whether a distance between the first header and the first footer is greater than a predetermined threshold; and
performing a content-based anchoring on content between the first header and the first footer in response to determining that the distance between the first header and the first footer is greater than the predetermined threshold.

17. The non-transitory machine-readable medium of claim 16, wherein the predetermined threshold represents a maximum deduplicated segment size of the storage system.

18. The non-transitory machine-readable medium of claim 14, wherein the operations further comprise:
if the matching content is found within the first proximity, searching at least a second portion of content of the first header within a second proximity after the predetermined distance to identify content matching the second portion of the content of the first header; and
indicating that a boundary of a data block corresponding to the first header is confirmed.

19. The non-transitory machine-readable medium of claim 18, wherein the second proximity after the predetermined distance is associated with a second header of a second data block as adjacent to the first data block.

20. The non-transitory machine-readable medium of claim 18, wherein the operations further comprise:
if the matching content is not found within the first proximity, adjusting the predetermined distance based on one of a plurality of distance candidates; and
iteratively performing identifying the first header and searching within the first proximity based on the adjusted predetermined distance, wherein the plurality of distance candidates represents a list of possible data block sizes.

21. A storage system, comprising:
a processor;
a memory coupled to the processor;
a boundary detector to receive a first data stream, the first data stream including a plurality of data blocks, wherein each data block includes a header and a footer, and to determine boundaries of the data blocks by matching at least a portion of a header with a footer of each data block and matching the at least a portion of the header with a header of an adjacent data block;
an anchoring unit to anchor the first data stream based on the determined boundaries of the data blocks using a plurality of anchors;
a deduplication engine to deduplicate the first data stream into a plurality of deduplicated data segments based on the plurality of anchors; and
one or more storage devices to store the deduplicated data segments.

22. The system of claim 21, wherein the boundary detector is to:
search within a predetermined proximity of each determined boundary of the first data stream to identify one or more markers prior to anchoring the first data stream, and
remove the one or more markers from the first data stream to generate a second data stream without the markers, wherein the anchoring by the anchoring unit is performed on the second data stream.

23. The system of claim 22, wherein searching within a predetermined area of each determined boundary of the first data stream comprises searching within a header area of each determined boundary of the first data stream to identify a marker based on a predetermined marker pattern.

24. The system of claim 21, wherein determining boundaries of the data blocks comprises:
  identifying a first header of a first of the data blocks of the first data stream based on a predetermined data pattern; and
  searching at least a first portion of content of the first header within a first proximity before a predetermined distance from the first header to identify content matching the first portion of the content of the first header.

25. The system of claim 24, wherein the first proximity before the predetermined distance represents a first footer of the first data block.

\* \* \* \* \*